US012695205B2

(12) United States Patent
Kambara

(10) Patent No.: US 12,695,205 B2
(45) Date of Patent: Jul. 28, 2026

(54) ELECTROMAGNETIC WAVE REFLECTING DEVICE AND ELECTROMAGNETIC WAVE REFLECTING FENCE

(71) Applicant: AGC Inc., Tokyo (JP)

(72) Inventor: Kumiko Kambara, Tokyo (JP)

(73) Assignee: AGC INC., Tokyo (JP)

( * ) Notice: Subject to any disclaimer, the term of this patent is extended or adjusted under 35 U.S.C. 154(b) by 75 days.

(21) Appl. No.: 18/936,242

(22) Filed: Nov. 4, 2024

(65) Prior Publication Data

US 2025/0062541 A1 Feb. 20, 2025

Related U.S. Application Data

(63) Continuation of application No. PCT/JP2023/015671, filed on Apr. 19, 2023.

(30) Foreign Application Priority Data

May 9, 2022 (JP) ................................ 2022-077189

(51) Int. Cl.
*H01Q 15/14* (2006.01)
*H01Q 19/10* (2006.01)

(52) U.S. Cl.
CPC ......... *H01Q 15/142* (2013.01); *H01Q 19/104* (2013.01)

(58) Field of Classification Search
CPC .... H01Q 15/14; H01Q 15/142; H01Q 19/104; H05K 9/00
See application file for complete search history.

(56) References Cited

U.S. PATENT DOCUMENTS

| | | | | |
|---|---|---|---|---|
| 5,147,694 A * | 9/1992 | Clarke | E06B 5/18 | 428/192 |
| 5,364,685 A * | 11/1994 | Nakashima | B32B 17/10376 | 428/209 |
| 2005/0039936 A1 | 2/2005 | Hikita et al. | | |
| 2020/0113087 A1 | 4/2020 | Hansen et al. | | |
| 2023/0023706 A1 | 1/2023 | Kambara et al. | | |

FOREIGN PATENT DOCUMENTS

| | | |
|---|---|---|
| EP | 4 311 027 A1 | 1/2024 |
| WO | WO-03/032702 A1 | 4/2003 |
| WO | WO-2021/199503 A1 | 10/2021 |
| WO | WO-2021/199504 A1 | 10/2021 |

OTHER PUBLICATIONS

International Searching Authority, "International Search Report," issued in connection with International Patent Application No. PCT/JP2023/015671, dated Jul. 18, 2023.
International Searching Authority, "Written Opinion," issued in connection with International Patent Application No. PCT/JP2023/015671, dated Jul. 18, 2023.

* cited by examiner

*Primary Examiner* — Daniel Munoz
(74) *Attorney, Agent, or Firm* — Foley & Lardner LLP

(57) ABSTRACT

The electromagnetic wave reflecting device includes: a reflection panel that reflects a radio wave of a desired band selected from a frequency band between 1 GHz and 170 GHz; and a frame that holds the reflection panel. The frame has a conductive portion. The reflection panel is held by the frame so that an edge of the reflection panel is not exposed to an outside of the frame. At least a part of the conductive portion of the frame is covered with a non-conductive protecting member or protective coating.

12 Claims, 10 Drawing Sheets

ELECTROMAGNETIC WAVE REFLECTING DEVICE AND ELECTROMAGNETIC WAVE REFLECTING FENCE

CROSS-REFERENCE TO RELATED APPLICATIONS

This application is a continuation application of International Application No. PCT/JP2023/015671 filed on Apr. 19, 2023, and designated the U.S., which is based upon and claims priority to Japanese Patent Application No. 2022-077189 filed on May 9, 2022, the entire contents of which are incorporated herein by reference.

TECHNICAL FIELD

The present invention relates to an electromagnetic wave reflecting device and an electromagnetic wave reflecting fence.

BACKGROUND

With automation of manufacturing processes and office work and introduction of control and management by artificial intelligence (AI), indoor base stations have been introduced into factories, plants, offices, commercial facilities, and the like. The fifth generation (hereinafter referred to as "5G") mobile communication standard provides a band called "sub-6" which is lower than 6 GHz and a 28 GHz band which is classified into a millimeter wave band. In the next-generation 6G mobile communication standard, extension to the sub-terahertz band is expected. Using such a high-frequency band allows the communication bandwidth to be greatly expanded, and a large amount of data communication is performed with low delay. In 5G, applications not only to public mobile communication networks but also to technology, automatic driving with IoTs (Internet of Things), industrial IoT represented by "smart factory", and the like are expected. A configuration in which an electromagnetic wave reflecting device is disposed along at least a part of a process line has been proposed (for example, see International Publication No. WO2021/199504).

Radio waves in the millimeter wave band and the sub-terahertz band have high straightness, a short propagation distance, and a large propagation loss due to high frequencies. There are various types of obstructions, such as devices and structures, in indoor facilities, such as factories, plants, and commercial facilities, and it is therefore difficult to maintain high communication quality. Although a radio wave propagation environment can be improved by using an electromagnetic wave reflecting device, it is desirable to cover a wide range of communication environments in accordance with the area of the facility. A similar request arises for Non-Line-Of-Sight (NLOS) sites where a base station antenna cannot be seen unobstructed, such as places where reflection on a wall surface or a street tree is frequent like a building street or an outdoor event site.

SUMMARY

According to one embodiment, an electromagnetic wave reflecting device includes: a reflection panel that reflects a radio wave of a desired band selected from a frequency band between 1 GHz and 170 GHz; and a frame that holds the reflection panel. The frame has a conductive portion. The reflection panel is held by the frame so that an edge of the reflection panel is not exposed to an outside of the frame. At least a part of the conductive portion of the frame is covered with a non-conductive protecting member or protective coating.

DETAILED DESCRIPTION

Figure 1:
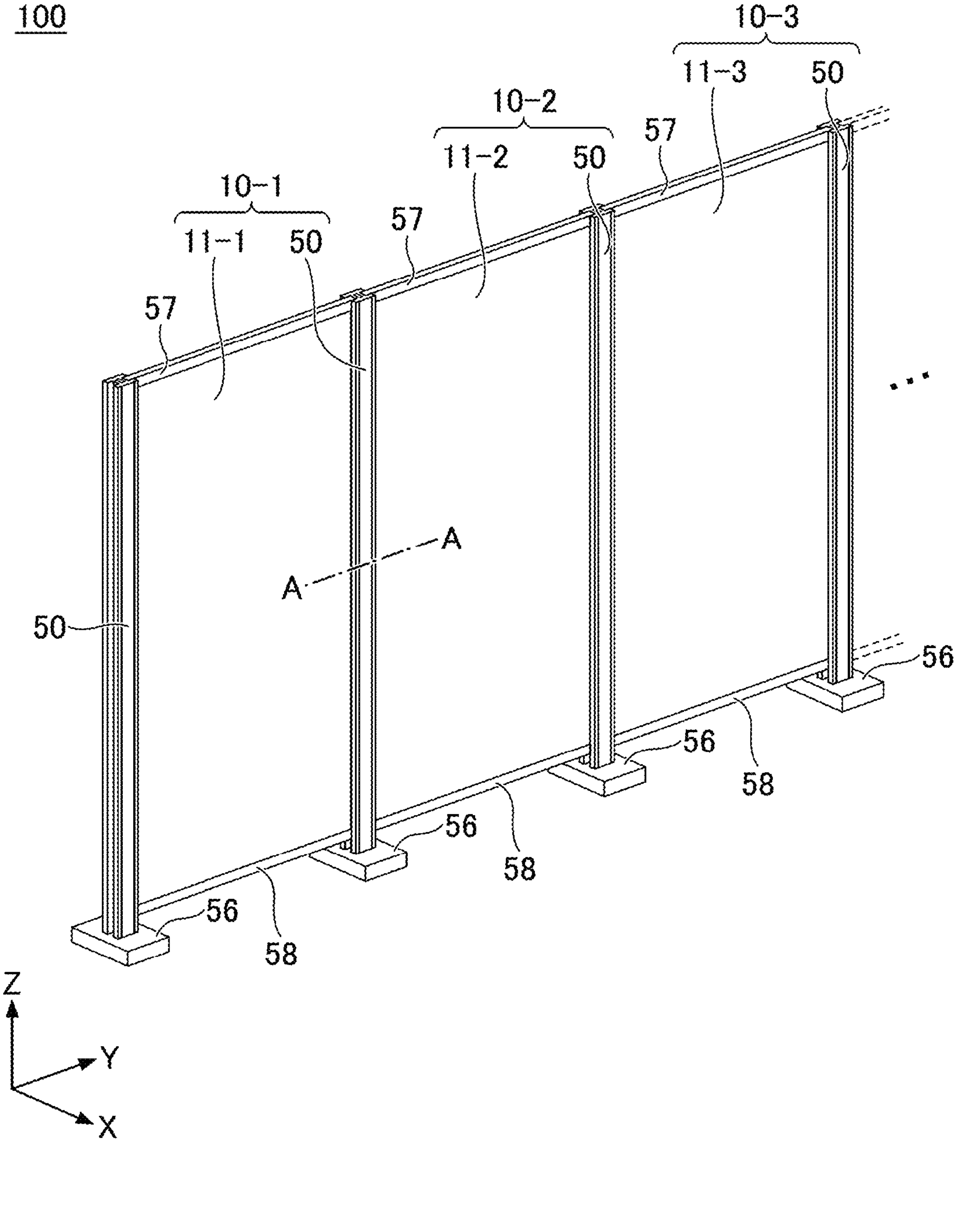
FIG. 1 is a schematic diagram of an electromagnetic wave reflecting fence in which a plurality of electromagnetic wave reflecting devices are joined.

In the case where an electromagnetic wave reflecting device is installed indoors or outdoors, it is desirable that an equipment engineer or a builder can easily assemble and install such a device according to the layout of a site of installation. In the case where an electromagnetic wave reflecting device having a large area size is installed, it is necessary to design an electromagnetic wave reflecting device having a stable structure with good reflection characteristics, including both a panel for reflecting electromagnetic waves and a support body for supporting the panel. If a part of the panel protrudes from the support body, reflection at an angle other than a desired angle of reflection may occur, and the effect of improving the communication environment may not be sufficiently obtained. Furthermore, there is a concern that the reflection efficiency is decreased if rust is generated on a support body supporting the panel due to the influence of moisture or salt, and the reflection direction is changed.

An objective of the present invention is to provide an electromagnetic wave reflecting device which can be stably installed while maintaining electromagnetic wave reflecting performance indoors and outdoors.

An electromagnetic wave reflecting device that can maintain electromagnetic wave reflection performance indoors and outdoors and can be stably installed is realized.

In an embodiment, at least part of a conductive portion of a frame that holds a reflection panel of an electromagnetic reflecting device is protected by a non-conductive protective coating or a non-conductive protecting member, and the reflection panel is held in such a manner that the edge of the reflection panel is not exposed to the outside of the frame. The "edge of the reflection panel" hereinafter refers to an edge surface in a thickness direction that connects the front surface and the rear surface of the reflection panel. The reflection panel is held in such a manner that the edges of the reflection panel are not exposed to the outside, so that undesirable reflection, for example a reflection in a direction other than a designed reflection direction, is suppressed. A non-conductive protective coating or a non-conductive protecting member is provided in at least the outer surface of the conductive portion of the frame. The conductive facing surfaces that face the edges of the reflection panel in the inside of the frame may be covered with the protective coating or the protecting member or exposed with no coating. The weather resistance and the reflection characteristics of the electromagnetic reflecting device are thus well maintained. In the following embodiments, the same components are denoted by the same reference numerals, and a redundant description may be omitted.

FIG. 1 is a schematic diagram of an electromagnetic wave reflecting fence 100 in which a plurality of electromagnetic wave reflecting devices 10-1, 10-2, and 10-3 are joined. Although FIG. 1 illustrates the electromagnetic wave reflecting fence 100 configured by three electromagnetic wave reflecting devices 10-1, 10-2, and 10-3 (hereinafter, they may be collectively referred to as "electromagnetic wave reflecting devices 10" as appropriate) joined by the frames 50, the number of the electromagnetic wave reflecting devices 10 to be joined is not particularly limited. A plane on which the electromagnetic wave reflecting device 10 is installed is an XY plane, and a direction orthogonal to the XY plane is a Z direction. The Z direction is a height direction of the electromagnetic wave reflecting fence 100, and the Y direction is a joining direction of the electromagnetic wave reflecting device 10 and a width direction of the frame 50.

The electromagnetic wave reflecting devices 10-1, 10-2, and 10-3 include reflection panels 11-1, 11-2, and 11-3 (hereinafter, they may be collectively referred to as "reflection panels 11" as appropriate), respectively. Each of the reflection panels 11 reflects electromagnetic waves of 1 GHz or more and 170 GHz or less, preferably 1 GHz or more and 100 GHz or less, and more preferably 1 GHz or more and 80 GHz or less. Each of the reflection panels 11 has, as a reflection film, a conductive film designed according to a target reflection mode, a target frequency band, or the like. The conductive film may be formed in a periodic pattern, a mesh pattern, a geometric pattern, a transparent film, or the like. As an example, the reflection panel 11 has a configuration in which a repeating pattern of metal mesh is interposed between two dielectric structures. The density and the repeating pattern cycle of the metal mesh are designed in accordance with a frequency of electromagnetic waves to be reflected. In this example, the metal mesh pattern is designed to reflect electromagnetic waves of 4 GHZ±1.5 GHz but it may be designed to reflect electromagnetic waves of 28 GHZ±5 GHZ.

Each of the reflection panels 11-1, 11-2, and 11-3 may have a specular reflection surface in which an angle of incidence and an angle of emergence of the electromagnetic wave are equal, or may be a non-specular reflection surface in which an angle of incidence and an angle of reflection are different from each other. Examples of the non-specular reflection surface include, in addition to a diffusion surface and a scattering surface, a metasurface which is an artificial reflection surface designed to reflect radio waves in a desired direction.

In some cases, from the viewpoint of maintaining continuity of a reflection potential, the reflection panels 11-1, 11-2, and 11-3 are preferably electrically connected to each other. As will be described later, in the electromagnetic wave reflecting device 10 and the electromagnetic wave reflecting fence 100, 80% or more of a scattering cross section in the case of using a single-panel electromagnetic wave reflecting device having no joint can be obtained, as long as the edges of the reflection panels 11 are not exposed to the outside of the frame 50. Therefore, the adjacent reflection panels 11 may be either electrically connected to each other with a physical contact with the frames 50, or held inside the frames 50 without a physical contact with the frames 50.

The electromagnetic wave reflecting device 10 includes legs 56 for supporting the frames 50, in addition to the reflection panels 11 and the frames 50. In addition to the frames 50, top frames 57 for holding the upper ends of the reflection panels 11 and bottom frames 58 for holding the lower ends of the reflection panels 11 may be used. In this case, the frames 50, the top frame 57, and the bottom frame 58 constitute a frame that holds the entire periphery of the reflection panel 11. The frame 50 may be referred to as a "side frame" due to its positional relationship with respect to the top frame 57 and the bottom frame 58. Provision of the top frames 57 and the bottom frames 58 in addition to the frames 50 ensures the mechanical strength and safety of the reflection panels 11 during transportation and assembly. Depending on purpose of use, the electromagnetic wave reflecting device 10 may be installed on a wall surface or a ceiling by using the frames 50, the top frames 57, and the bottom frames 58 to hold the reflection panels 11, without using the legs 56.

Figure 2A:
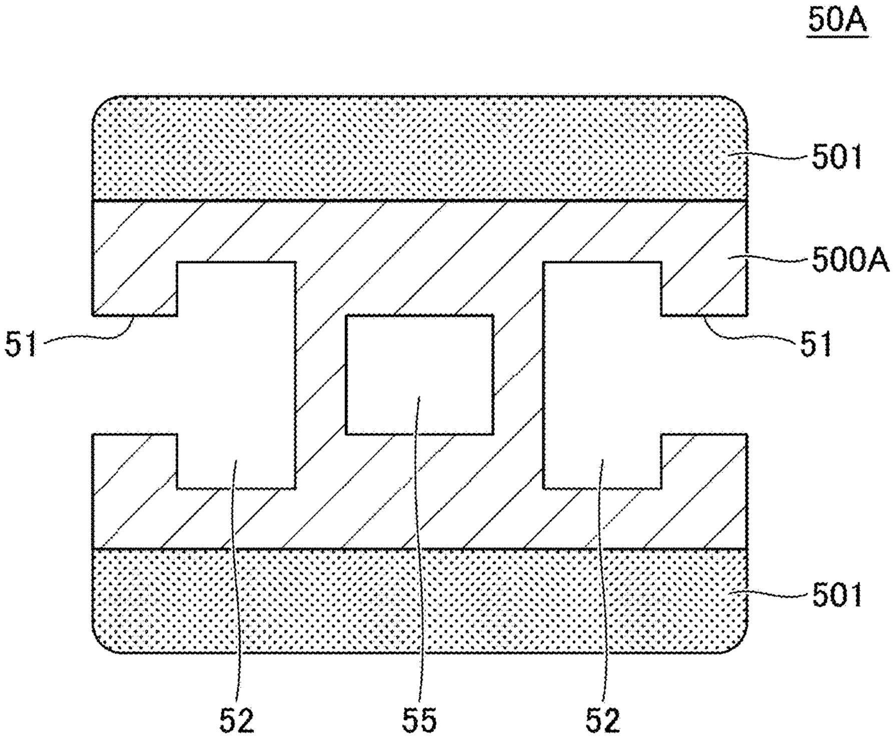
FIG. 2A is a horizontal cross-sectional view of a frame taken along line A-A of FIG. 1.
Figure 2B:
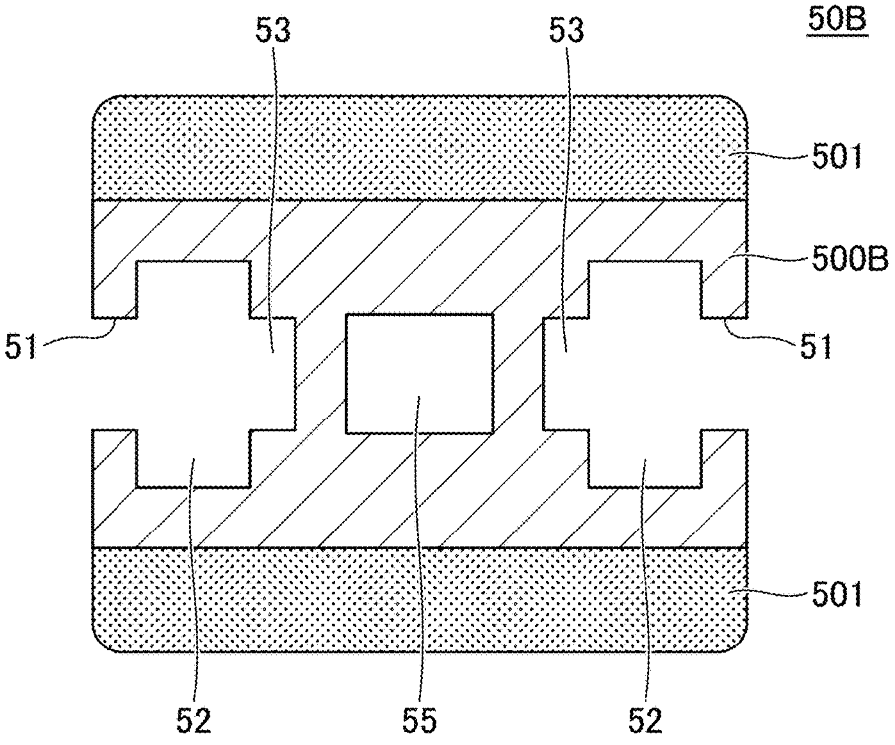
FIG. 2B is a horizontal cross-sectional view of a frame taken along line A-A of FIG. 1.

FIG. 2 is a horizontal cross-sectional view of the frame 50 taken along line A-A in FIG. 1, which is parallel to the XY plane. The cross-sectional configuration of the frame 50 may be the configuration illustrated in FIG. 2A or the configuration illustrated in FIG. 2B. The frame 50A of FIG. 2A has a main body 500A formed of a conductive material, and non-conductive covers 501 are provided on the outer surfaces of the conductive main body 500A. The covers 501 function as a protecting member for the frame 50A. The conductive main body 500A has slits 51 formed on both sides in the widthwise direction. The slit 51 holds the side edge of the reflection panel 11. The side edges of the reflection panel 11 are an edge along the height (Z) direction in FIG. 1.

In the main body 500A, cavities 52 communicating with the slits 51 and a hollow 55 not communicating with the slits 51 and the cavities 52 are formed. Although the hollow 55 is not essential, the weight of the frame 50A can be reduced by providing the cavities 52 and the hollow 55 in the frame 50A.

The frame 50B of FIG. 2B has a main body 500B formed of a conductive material, and non-conductive covers 501 are provided on the outer surfaces of the conductive main body 500B. The covers 501 function as a protecting member for the frame 50B. The frame 50B includes slits 51 formed on both sides of the main body 500B in the width direction. The main body 500B is provided with cavities 52 communicating with the slits 51, grooves 53 provided in the cavities 52, and a hollow 55 not communicating with the cavities 52 and the grooves 53. The groove 53 is provided at a position facing the slit 51 with the cavity 52 interposed therebetween. The groove 53 holds the side edge of the reflection panel 11 that is inserted from the slit 51. The weight of the frame 50B can be reduced by providing the cavities 52 and the hollow 55 in the frame 50B. Provision of the grooves 53 in the cavities 52 stabilizes the retention of the reflection panels 11.

Figure 3A:
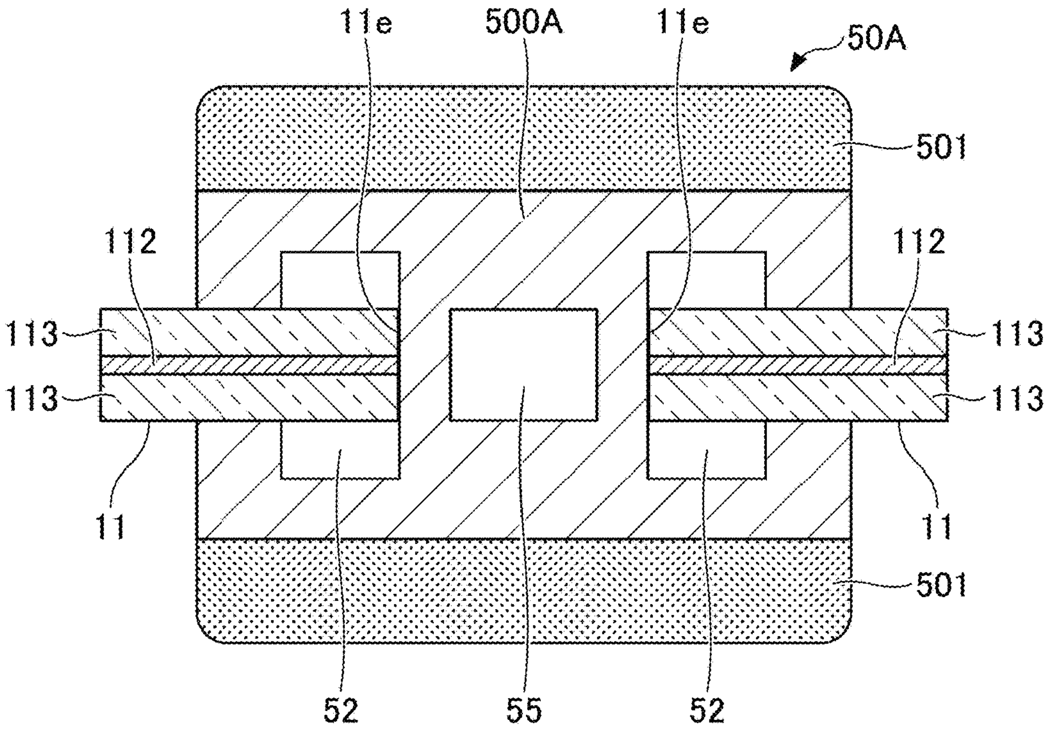
FIG. 3A is a diagram illustrating a state in which panels are inserted into the frame of FIG. 2A.

FIG. 3 is a horizontal cross-sectional view illustrating the state of insertion of the reflection panels 11 into the frame 50A. In FIG. 3A, the reflection panels 11 are inserted into the end of the cavities 52, and the edges 11*e* of the reflection panels 11 are in contact with the main body 500A. The reflection panel 11 has a configuration in which a conductive layer 112, such as a metal mesh, is interposed between dielectric layers 113. The conductive layer 112 forms a reflective surface of the reflection panel 11, and is designed to reflect electromagnetic waves in a desired frequency band in a desired direction at a desired level. At the edge 11*e* of the reflection panel 11, the conductive layer 112 is in a physical contact with the main body 500A and is electrically connected to the adjacent reflection panel 11 through the main body 500A.

Figure 3B:
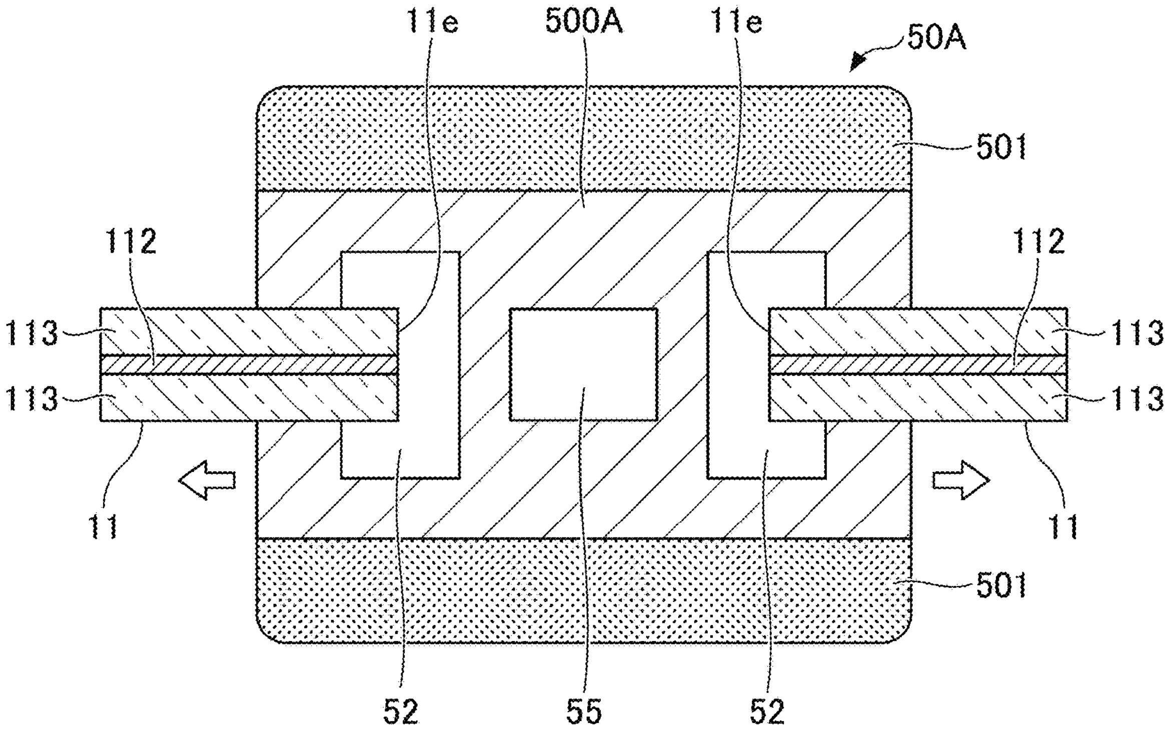
FIG. 3B is a diagram illustrating a state in which panels are inserted into the frame of FIG. 2A.

In FIG. 3B, the reflection panels 11 are shifted in the outward directions toward the outside of the frame 50A as indicated by the arrows. The edges 11*e* of the reflection panels 11 are away from the body 500A, and there is no physical and electrical contact between the conductive layer 112 of the reflection panel 11 and the conductive body 500A; on the other hand, the edges 11*e* of the reflection panels 11 are maintained inside the cavities 52 and are not exposed outside the frame 50A. Although there is no electrical connection through a physical contact between the adjacent reflection panels 11 in this state, an electric field generated at the reflective surface of the reflection panel 11 can propagate from the conductive layer 112 to the main body 50A of the frame 500A. In the state of FIG. 3B, 80% or more of a scattering cross section in the case of using a continuous single panel is obtained, and the reflection characteristics are maintained. The reason why the reflection characteristics are maintained will be described later.

In each of the reflection panels 11, the pattern of the conductive layer 112, the thickness and the permittivity of the dielectric layer 113, and the like are designed so that desired reflection characteristics can be obtained. Even in the case where the frame 50A is mostly made of a non-conductive material like a resin, as long as at least the surface facing the edge 11*e* of the inserted reflection panel 11 through the surface facing the edge 11*e* of the adjacent reflection panel 11 is made of a conductive material, 80% or more of the scattering cross section in the case of using an electromagnetic wave reflection device of a continuous single panel can be obtained even in the state of FIG. 3B.

Figure 4A:
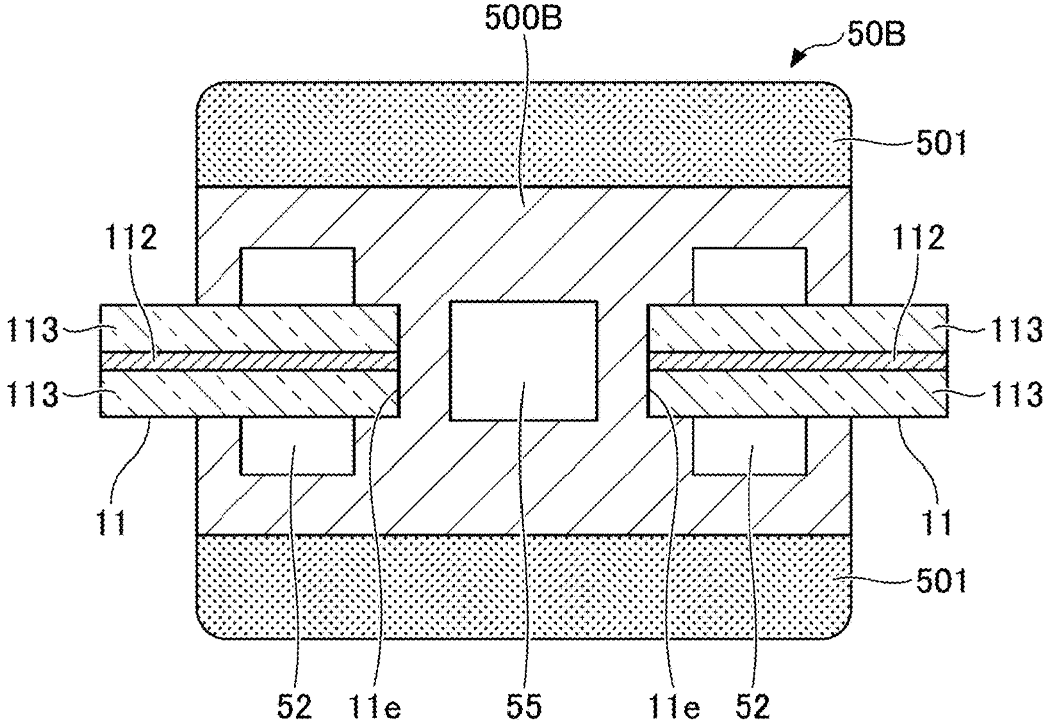
FIG. 4A is a diagram illustrating a state in which panels are inserted into the frame of FIG. 2B.

FIG. 4 is a horizontal cross-sectional view illustrating the state of insertion of the reflection panels 11 into the frame 50B. In FIG. 4A, the reflection panels 11 are inserted into the end of the grooves 53 of the cavities 52, and the edges 11*e* of the reflection panels 11 are in contact with the main body 500B. At the edge 11*e* of the reflection panel 11, the conductive layer 112 is in physical contact with the main body 500B and is electrically connected to the adjacent reflection panel 11 through the main body 500B.

Figure 4B:
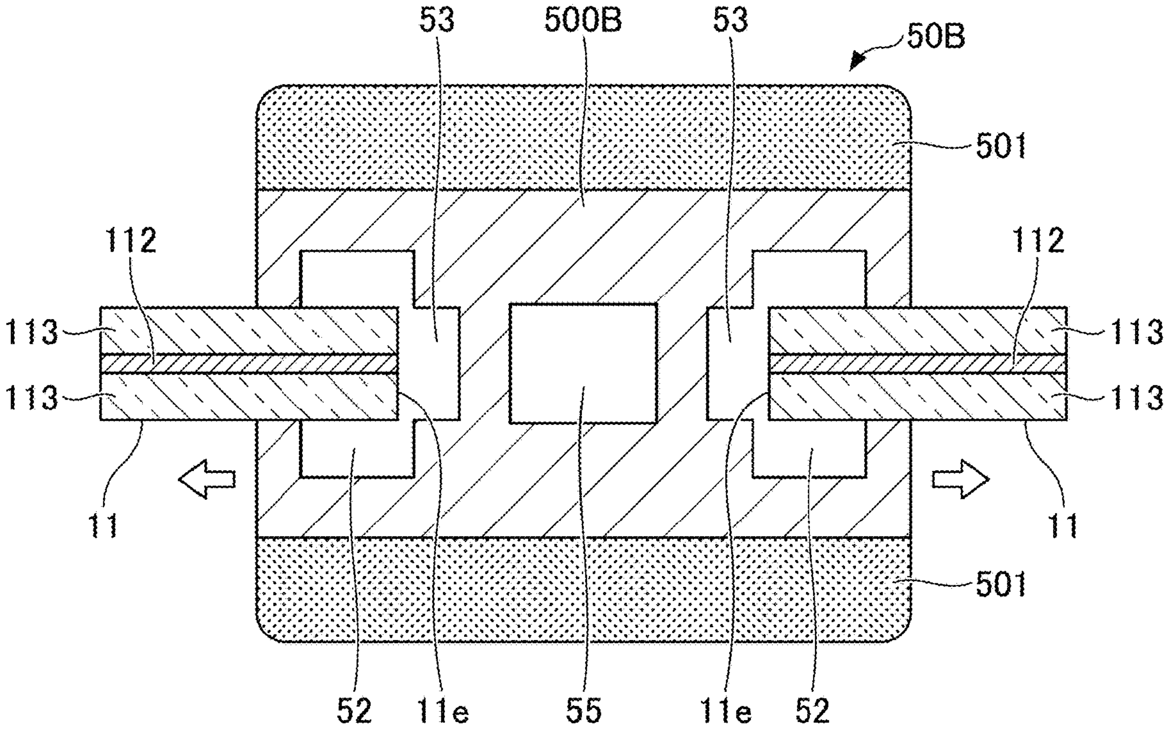
FIG. 4B is a diagram illustrating a state in which panels are inserted into the frame of FIG. 2B.

In FIG. 4B, the reflection panels 11 are shifted in the outward directions toward the outside of the frame 50B as indicated by the arrows, and the edges 11*e* are outside the grooves 53. Although there is no physical and electrical contact between the conductive layer 112 of the reflection panel 11 and the conductive body 500B, the edges 11*e* of the reflection panels 11 are maintained inside the cavities 52 and not exposed outside the frame 50B. A reflected electric field generated in the conductive layer 112 of the reflection panel 11 may propagate from the edge 11*e* to the main body 500B of the frame 50B. In the state of FIG. 4B, 80% or more of a scattering cross section in the case of using a continuous single panel is obtained, and the reflection characteristics are maintained. The reason will be described later.

In each of the reflection panels 11, the pattern of the conductive layer 112, the thickness and the permittivity of the dielectric layer 113, and the like are designed so that desired reflection characteristics can be obtained. Even in the case where the frame 50B is mostly made of a non-conductive material like a resin, as long as at least the surface facing the edge 11*e* of the inserted reflection panel 11 through to the surface facing the edge 11*e* of the adjacent reflection panel 11 is made of a conductive material, 80% or more of the scattering cross section in the case of using an electromagnetic wave reflection device of a continuous single panel can be obtained even in the state of FIG. 4B.

Figure 5:
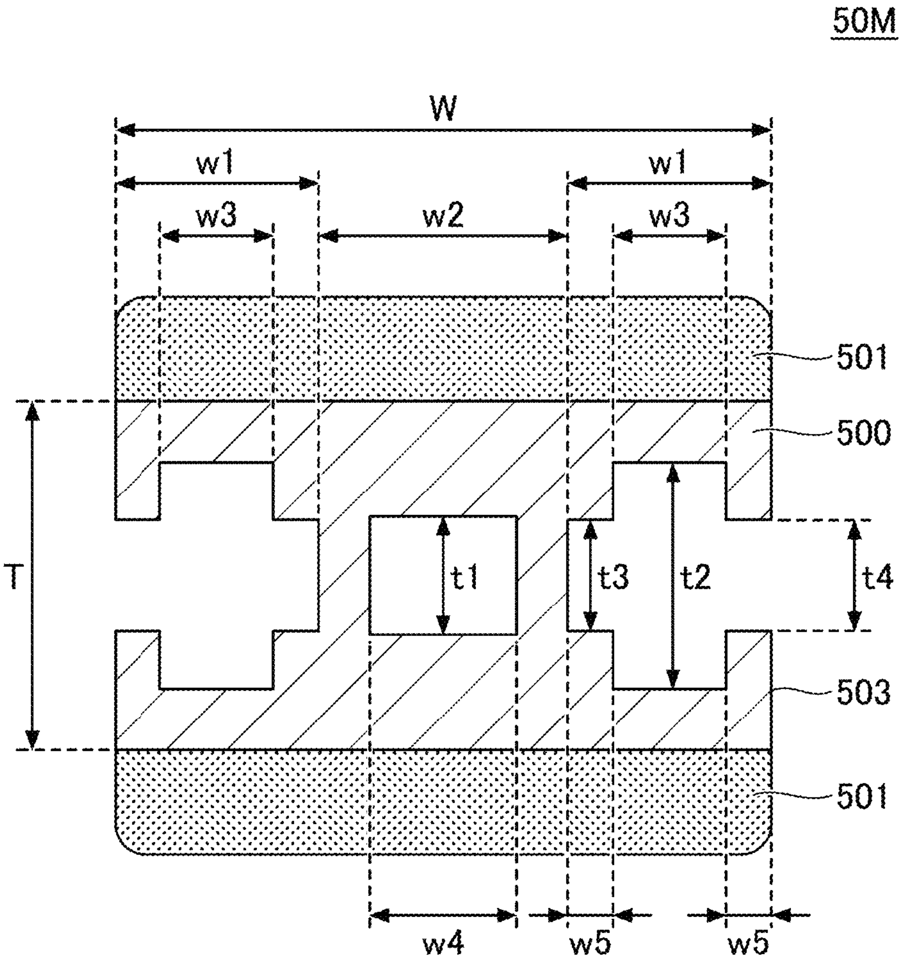
FIG. 5 is a diagram illustrating a frame model used for simulation of reflection characteristics.

How far the reflection panels 11 held by the frames 50 can be shifted to maintain reflection characteristics is verified in a simulation. FIG. 5 is a model diagram of the frame 50M used for a simulation of reflection characteristics. As the frame 50M for a simulation, a body 500 of aluminum of the same type as the frame 50B of FIG. 4 is used. A total thickness T of the body 500 is set to 16.0 mm and a total width W is set to 60.0 mm. A cover 501 of polyvinylchloride (PVC) having a thickness of 5.0 mm and a width of 60.0 mm is attached to the outer surfaces of the body 500. The PVC covers 501 are an example of a non-conductive protecting member. The curvature radius of the corner portion of the cover 501 is 2.0 mm. The reflection panels are inserted from the edge surfaces 503 which are not covered by the cover 501.

The hollow 55 formed in the main body 500 has a thickness t1 of 6.0 mm and a width w4 of 20.0 mm. The cavity 52 has a thickness t2 of 11.0 mm and a width w3 of 7.5 mm. The groove 53 provided in the cavity 52 has a thickness t3 of 5.5 mm and a width w5 of 3.75 mm. The slit 51 has a spacing t4 of 6.0 mm and a widthwise size w5 of 3.75 mm. The distance w1 from the entrance of the slit 51 to the groove 53 is 15.0 mm, and the distance w2 between the grooves 53 is 30.0 mm.

Suppose the state of FIG. 4A in which the reflection panels 11 are inserted into the end of the grooves 53 from the slits 51 on both sides of the main body 500 is "an offset of 0.0 mm". Reflection characteristics are calculated by gradually shifting the reflection panels 11 in the directions (the outward directions) indicated by the arrows in FIG. 4B from the state of an offset of 0.0 mm. The reflection panels 11 used in the simulation have a configuration in which a conductive layer 112 made of stainless steel (SUS) (1.0 mm) is interposed and glued between dielectric layers 113 made of polycarbonate (2.0 mm). The total thickness of the reflection panel 11 is 5.0 mm.

Figure 6:
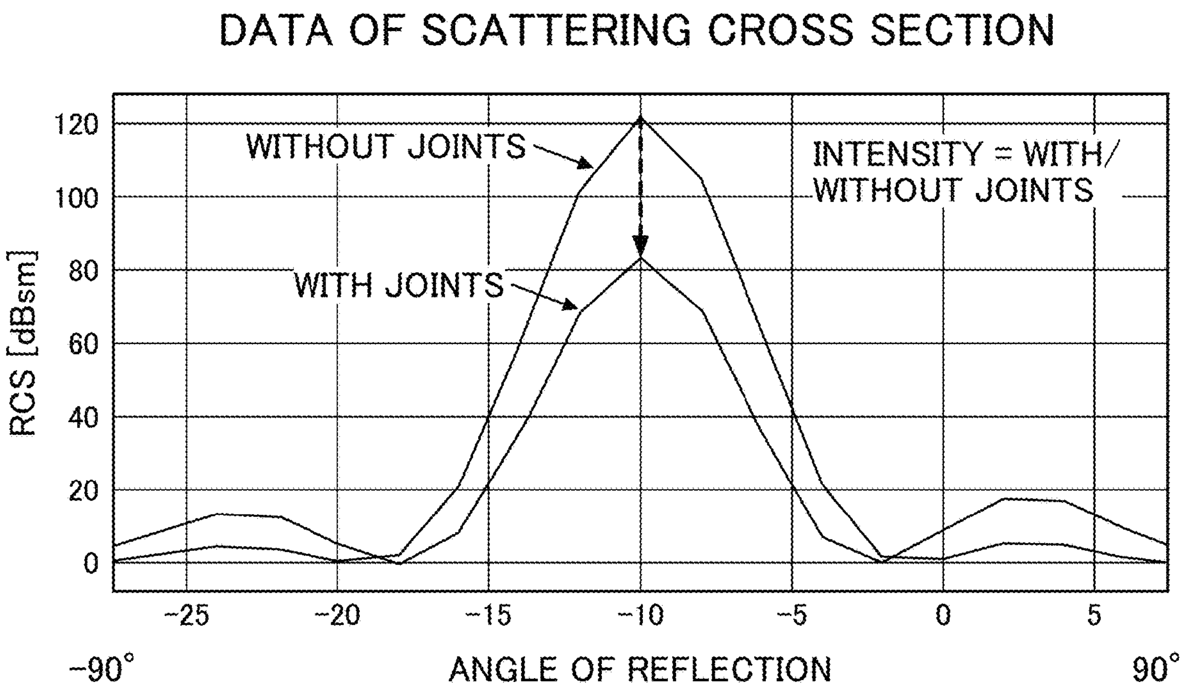
FIG. 6 is a diagram illustrating a method of calculating reflection characteristics.

FIG. 6 is a diagram illustrating a method of calculating reflection characteristics. Reflection characteristics are represented by a radar cross section (RCS) of the vertical axis, namely a peak ratio of the scattering cross section. An RCS is used as an indicator of the ability to reflect incident electromagnetic waves. The peak ratio is a ratio of a peak intensity of a scattering cross section of the reflection panels 11 that are joined by the frame 50 to a peak intensity of a single-panel scattering cross section with no joint by the frame 50.

By joining two reflection panels 11 by the frame 50, the main peak intensity of the RCS is decreased as compared to a single reflection panel with no joint. The smaller the degree of the decrease is, the better the reflection characteristics are. If the main peak intensity is decreased by 20% or less, in other words, if a scattering cross section of 80% or more of the scattering cross section of a single-panel electromagnetic wave reflecting device is obtained, the reflection panels 11 effectively function as the electromagnetic wave reflecting devices. In the evaluation, general-purpose, three-dimensional electromagnetic field simulation software is used, and plane waves of 3.8 GHz are reflected by an electromagnetic wave reflecting device, and a scattering cross section is thereby analyzed.

Figure 7:
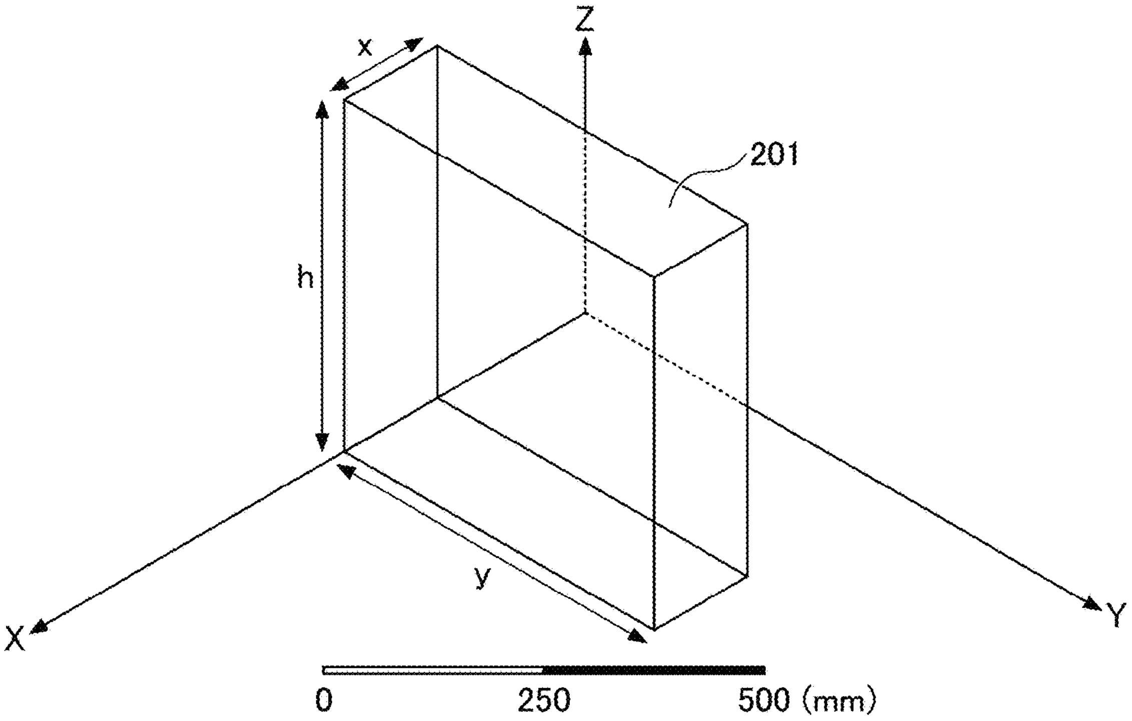
FIG. 7 is a diagram illustrating an electromagnetic wave analysis space.
Figure 8:
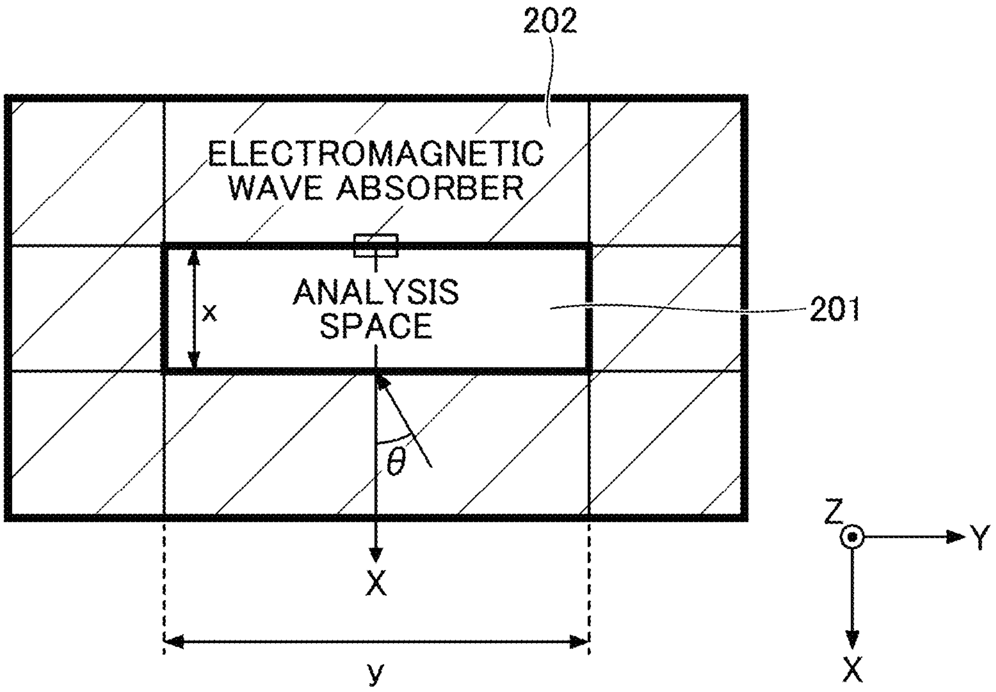
FIG. 8 is a diagram illustrating an electromagnetic wave analysis space.

FIGS. 7 and 8 illustrate an analysis space 201 of the electromagnetic wave simulation. If the thickness direction of the reflection panels 11 is an x direction, the width direction is a y direction, and the height direction is a z direction (see FIG. 1), the analysis space is expressed by (size in the x direction)×(size in the y direction)×(size in the z direction). If an incident electromagnetic wave has a frequency of 3.8 GHz, the dimensions of the analysis space are set to 150 mm×500 mm×500 mm. The boundary condition is a design in which an electromagnetic wave absorber 202 is arranged around the analysis space 201, as illustrated in FIG. 8.

The intensity ratio of the main peak of the scattering cross section is calculated under the above-described conditions, with changing an offset of the reflection panels 11 from 0.0 mm.

Example 1

The reflection panels 11 are inserted into the end of the grooves 53 of the cavities 52 of the aluminum-made main body of the frame 50 (an offset of 0.0 mm), and electromagnetic waves of 3.8 GHz are made incident on the electromagnetic reflection devices. The angle of incidence is changed from 0° to 60° in increments of 10°, and the intensity ratio of the main peak of the scattering cross section is calculated at each angle of incidence. The incident angle of 0° is a normal incidence with respect to the reflection panels 11. Reflection characteristics are evaluated by an average value of the intensity ratio of the main peak calculated at multiple angles of incidence. The intensity ratio of the main peak at each angle of incidence is as shown in Table 1.

TABLE 1

| Angle of incidence | 0° | 10° | 20° | 30° | 40° | 50° | 60° |
|---|---|---|---|---|---|---|---|
| Intensity ratio | 0.81 | 0.83 | 0.84 | 0.81 | 0.91 | 0.90 | 0.71 |

The average of the intensity ratio of the main peak at the offset of 0.0 mm is 0.83, and it can be understood that good reflection characteristics can be obtained by the configuration in which a plurality of reflection panels are joined by the frame 50.

Example 2

Inside the frames 50, the reflection panels 11 are shifted by 0.5 mm in respective directions from the state of an offset 0.0 mm (an offset of 0.5 mm), and electromagnetic waves of 3.8 GHz are made incident on the electromagnetic reflection devices. If an offset is 0.5 mm, the conductive layer 112 of the reflection panel 11 is not in physical contact with the main body 500 of the frame 50, but the edge 11*e* of the reflection panel 11 is located inside the groove 53, and the reflection panel 11 is securely held by the grooves 53 and the slits 51. The angle of incidence is changed from 0° to 60° in increments of 10°, and the intensity ratio of the main peak of the scattering cross section is calculated at each angle of incidence. The intensity ratio of the main peak at each angle of incidence is as shown in Table 2.

TABLE 2

| Angle of incidence | 0° | 10° | 20° | 30° | 40° | 50° | 60° |
|---|---|---|---|---|---|---|---|
| Intensity ratio | 0.83 | 0.81 | 0.80 | 0.78 | 0.86 | 0.88 | 0.68 |

The average of the intensity ratio of the main peak at an offset of 0.5 mm is 0.81. Although the average of the intensity ratio of the main peak is slightly decreased as compared to Example 1, 80% or more of the main peak of the scattering cross section of a single panel is obtained, and the reflection panels 11 effectively function as the electromagnetic wave reflecting devices.

Example 3

Inside the frames 50, the reflection panels 11 are shifted by 7.5 mm in respective directions from the state of an offset of 0.0 mm (an offset of 7.5 mm), and electromagnetic waves of 3.8 GHz are made incident. If an offset is 7.5 mm, the edge 11*e* of the reflection panel 11 is dislocated from the grooves 53 but located in the inside of the cavities 52, and the reflection panel 11 is held by the slits 51. The angle of incidence is changed from 0° to 60° in increments of 10°, and the intensity ratio of the main peak of the scattering cross section is calculated at each angle of incidence. The intensity ratio of the main peak at each angle of incidence is as shown in Table 3.

TABLE 3

| Angle of incidence | 0° | 10° | 20° | 30° | 40° | 50° | 60° |
|---|---|---|---|---|---|---|---|
| Intensity ratio | 0.78 | 0.81 | 0.83 | 0.77 | 0.88 | 0.86 | 0.63 |

The average of the intensity ratio of the main peak at the offset of 7.5 mm is 0.80. Although the average of the intensity ratio of the main peak is further decreased as compared to Example 2, 80% or more of the main peak of the scattering cross section of a single panel is obtained, and the reflection panels 11 effectively function as the electromagnetic wave reflecting devices.

Example 4

Inside the frames 50, the reflection panels 11 are shifted by 15.0 mm in both directions illustrated by the arrows of FIG. 4B from the state of an offset 0.0 mm (an offset of 15.0 mm), and electromagnetic waves of 3.8 GHz are made incident. If an offset is 15.0 mm, the position of the edge 11*e* of the reflection panel 11 corresponds to the edge surface 503 of the frame 50M in the width direction, and the edge 11*e* is not exposed to the outside of the frame 50M. The angle of incidence is changed from 0° to 60° in increments of 10°, and the intensity ratio of the main peak of the scattering cross section is calculated at each angle of incidence. The intensity ratio of the main peak at each angle of incidence is as shown in Table 4.

TABLE 4

| Angle of incidence | 0° | 10° | 20° | 30° | 40° | 50° | 60° |
|---|---|---|---|---|---|---|---|
| Intensity ratio | 0.80 | 0.80 | 0.80 | 0.77 | 0.88 | 0.89 | 0.68 |

The average of the intensity ratio of the main peak at the offset of 15.0 mm is 0.80. By not allowing the edge 11*e* of the reflection panel 11 to be exposed to the outside of the frame 50M, 80% or more of the main peak of the scattering cross section of a single panel can be obtained, similarly to Example 3. From the view point of stable retention of the reflection panels 11, it is desirable that the edges 11*e* of the reflection panels 11 be inserted in the slits 51, and in the case of the model illustrated in FIG. 5, it is desirable that the edges 11*e* are inserted into the slits 51 for the depth of 2.0 mm to 3.0 mm.

Comparative Example 1

Inside the frames 50, the reflection panels 11 are shifted by 25.0 mm in respective directions illustrated by the arrows in FIG. 4B from the state of an offset of 0.0 mm (an offset of 25.0 mm), and electromagnetic waves of 3.8 GHz are made incident thereto. If an offset is 25.0 mm, the position of the edge 11*e* of the reflection panel 11 is completely dislocated from the frame 50M, and the edge 11*e* is exposed to the outside of the frame 50M. The angle of incidence is changed from 0° to 60° in increments of 10°, and the intensity ratio of the main peak of the scattering cross section is calculated at each angle of incidence. The intensity ratio of the main peak at each angle of incidence is as shown in Table 5.

TABLE 5

| Angle of incidence | 0° | 10° | 20° | 30° | 40° | 50° | 60° |
|---|---|---|---|---|---|---|---|
| Intensity ratio | 0.80 | 0.68 | 0.67 | 0.65 | 0.76 | 0.82 | 0.54 |

The average of the intensity ratio of the main peak at the offset of 25.0 mm is 0.70. By allowing the edges 11*e* of the reflection panels 11 to be exposed to the outside of the frames 50M, the loss in the conductive layers 112 increases, and only 70% of the main peak of the scattering cross section of a single panel is obtained. In the case where the reflection panels 11 are not held by the frames 50 but adhered to, for example, a wall surface, good reflection characteristics can be obtained at a normal incidence and an incident angle of 50°; on the other hand, the range of angles that can be covered by the electromagnetic wave reflecting devices is limited.

Comparative Example 2

Inside the frames 50, the reflection panels 11 are shifted by 20.0 mm in respective directions illustrated by the arrows of FIG. 4B from the state of an offset of 0.0 mm (an offset of 20.0 mm), and electromagnetic waves of 3.8 GHz are made incident. If an offset is 25.0 mm, the position of the edge 11*e* of the reflection panel 11 is completely dislocated from the frame 50M, and the edge 11*e* is exposed to the outside of the frame 50M. The angle of incidence is changed from 0° to 60° in increments of 10°, and the intensity ratio of the main peak of the scattering cross section is calculated at each angle of incidence. The intensity ratio of the main peak at each angle of incidence is as shown in Table 6.

TABLE 6

| Angle of incidence | 0° | 10° | 20° | 30° | 40° | 50° | 60° |
|---|---|---|---|---|---|---|---|
| Intensity ratio | 0.80 | 0.73 | 0.73 | 0.70 | 0.81 | 0.86 | 0.60 |

The average of the intensity ratio of the main peak at the offset of 20.0 mm is 0.75. Although the edges 11*e* of the reflection panels 11 are brought closer to the frames 50M than in Comparative Example 1, the exposure of the edges 11*e* to the outside of the frames 50M causes a loss in the conductive layers 112, and only 75% of the main peak of the scattering cross section of a single panel is obtained. In the case where the reflection panels 11 are not held by the frames 50 but adhered to, for example, a wall surface, good reflection characteristics can be obtained at a normal incidence and an incident angle range from 40° to 50°; on the other hand, the range of angles that can be covered by the electromagnetic wave reflecting devices is limited.

According to Examples 1 through 4 and Comparative Examples 1 and 2, the conductive layers 112 of the reflection panels 11 are not necessarily in physical contact with the conductive main bodies 500 of the frames 50. As long as the edges 11*e* of the reflection panels 11 are not exposed to the outside of the frames 50, the reflection panels 11 are held by the frames 50 with or without contact between the edges 11*e* and the facing surfaces of the main bodies 500, and necessary reflection characteristics can be obtained. This suggests that the entirety of the main body 500 of the frame 50 does not need to be made of a conductive material. This is because necessary reflection characteristics can be obtained through the conductive portions of the main bodies 500, even if the conductive layers 112 of the reflection panels 11 are not in contact with the conductive portions of the main bodies 500, as long as the edges 11*e* of the reflection panels 11 are not exposed to the outside of the frames 50.

For this reason, the reflection characteristics in the case where a non-conductive coating is provided in a part of the surfaces of the frames 50 are verified. In the case where the electromagnetic wave reflecting device 10 or the electromagnetic wave reflecting fence 100 is installed indoors or outdoors, rust is generated on the metal surfaces of the frames 50 due to moisture or salt. If a non-conductive coating can be used as an anti-rust coating, the weather resistance would be improved and the reflection characteristics can be well maintained. Therefore, measurement of reflection characteristics of the frames provided with a non-conductive coating is described hereinafter.

Example 5

Figure 9:
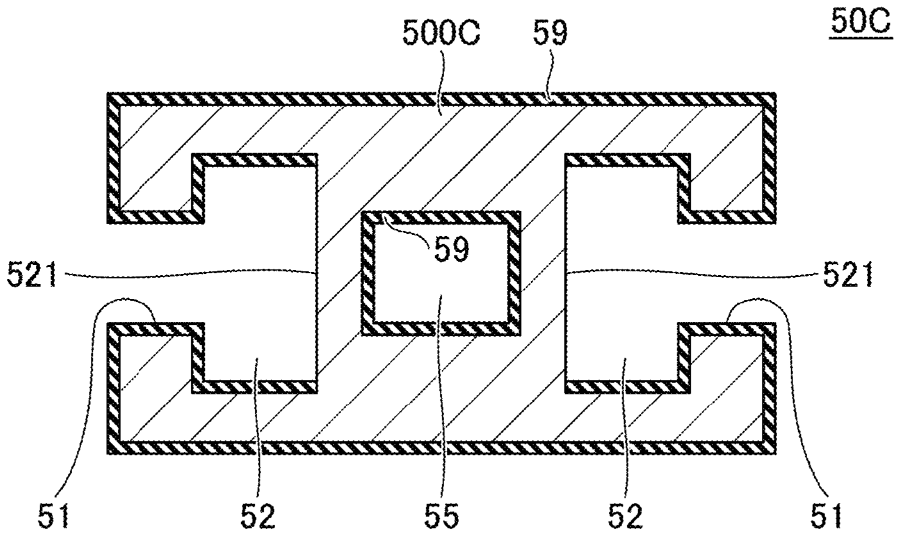
FIG. 9 is a horizontal cross-sectional view of a frame of Example 5.

FIG. 9 is a horizontal cross-sectional view of a frame 50C of Example 5. The frame 50C has a conductive body 500C of the same type as the main body 500A of the frame 50A of FIG. 3. At least part of the surface of the conductive body 500C is covered with a protective coating 59 made of a non-conductive material, for example aluminum oxide ($Al_2O_3$). In FIG. 9, the outer surface of the main body 500C and the inner wall of the hollow 55, the slits 51, and the cavities 52 are covered with the non-conductive protective coating 59, and the conductive facing surfaces 521 facing the edges 11*e* of the reflection panels 11 inside the frame 50C are not covered with the protective coating 59.

Reflection attenuation is measured by the S-parameter method using a vector network analyzer and a free-space oblique incidence measuring device in a state where the reflection panels 11 are inserted into the cavities 52 until the edges 11*e* (see FIG. 3A) come into contact with the facing surfaces 521. As an S-parameter (scattering parameter), the ratio of reflection ($S_{11}$) to transmission ($S_{21}$) is measured. The reflection attenuation is 0.00 dB in the case where electromagnetic waves that are made incident to the electromagnetic reflecting device are 4.9 GHZ, and the reflection attenuation is −0.02 dB in the case where electromagnetic waves that are made incident to the electromagnetic reflecting device are 28.0 GHZ.

Example 6

Figure 10:
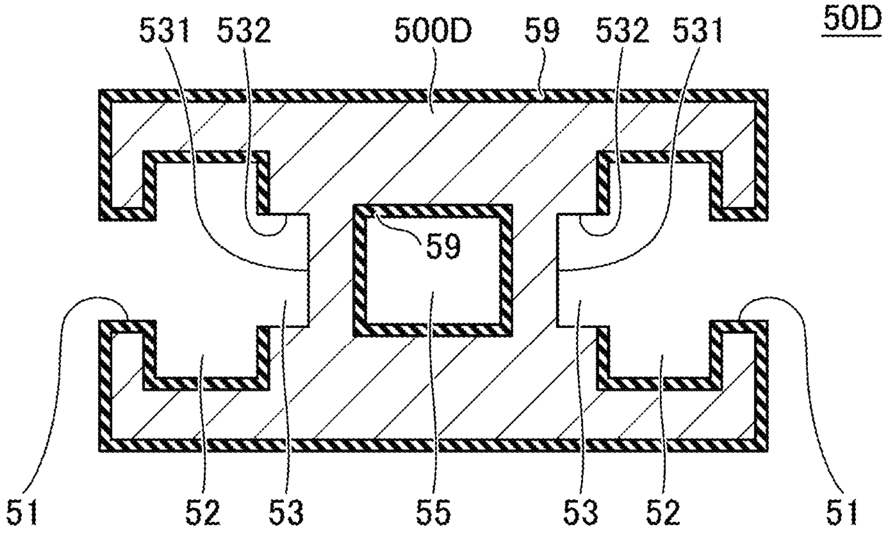
FIG. 10 is a horizontal cross-sectional view of a frame of Example 6.

FIG. 10 is a horizontal cross-sectional view of a frame 50D of Example 6. The frame 50D has a conductive main body 500D of the same type as the main body 500B of the frame 50B of FIG. 4. At least part of the surface of the conductive body 500D is covered with a protective coating 59 made of a non-conductive material, for example aluminum oxide ($Al_2O_3$). In FIG. 10, the outer surfaces of the main body 500D and the inner wall of the hollow 55, the slits 51, and the cavities 52 are covered with the non-conductive protective coating 59, and the base surfaces 531 and the side surfaces 532 of the grooves 53 are not covered with the protective coating 59. The base surfaces 531 of the grooves 53 are the surfaces facing the edges 11*e* of the reflection panels 11.

Reflection attenuation in the electromagnetic wave reflecting device is measured by the S-parameter method using a vector network analyzer and a free-space oblique incidence measuring device in a state where the reflection panels 11 are inserted into the grooves 53 until the edges 11*e* (see FIG. 4A) come into contact with the base surfaces 531 of the grooves 53. As an S-parameter (scattering parameter), the ratio of reflection ($S_{11}$) to transmission ($S_{21}$) is measured. The reflection attenuation is 0.00 dB in the case where electromagnetic waves that are made incident to the electromagnetic wave reflecting device are 4.9 GHZ, and the reflection attenuation is −0.01 dB in the case where electromagnetic waves that are made incident to the electromagnetic reflecting device are 28.0 GHZ.

Example 7

Figure 11:
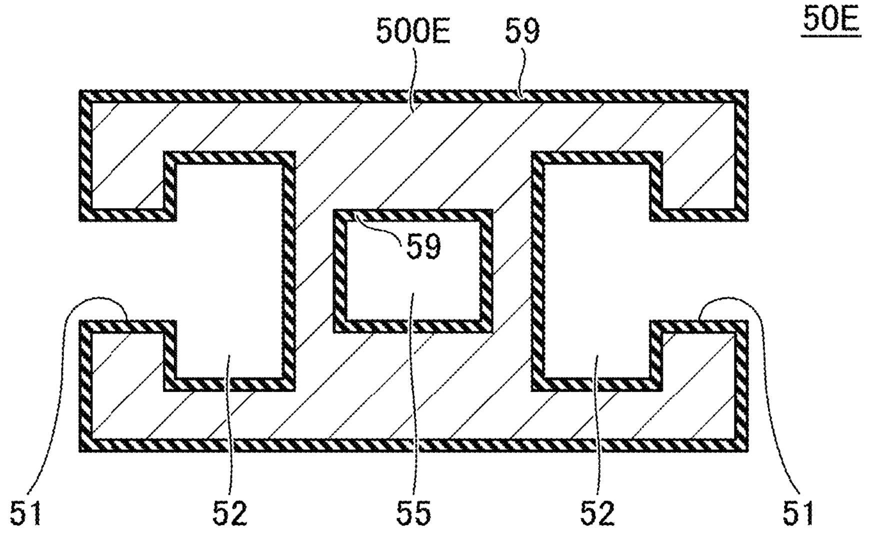
FIG. 11 is a horizontal cross-sectional view of a frame of Example 7.

FIG. 11 is a horizontal cross-sectional view of a frame 50E of Example 7. The frame 50E has a conductive main body 500E of the same type as the main body 500A of the frame 50A of FIG. 3. All surfaces of the main body 500E that are in contact with the ambient air are covered with a protective coating 59 of aluminum oxide ($Al_2O_3$). Unlike FIGS. 9 and 10, the protective coating 59 is provided on the entire surfaces of the main body 500E without peeling off the protective coating 59 on the surfaces facing the edges 11*e* of the inserted reflection panels 11.

Reflection attenuation in the electromagnetic wave reflecting device is measured by the S-parameter method using a vector network analyzer and a free-space oblique incidence measuring device in a state where the reflection panel 11 is inserted into the cavities 52 until the edges 11*e* (see FIG. 3A) come into contact with the main body 500E covered with the protective coating 59. As an S-parameter (scattering parameter), the ratio of reflection ($S_{11}$) to transmission ($S_{21}$) is measured. The reflection attenuation is −0.05 dB in the case where electromagnetic waves that are made incident to the electromagnetic wave reflecting device are 4.9 GHz, and the reflection attenuation is −0.10 dB in the case where electromagnetic waves that are made incident to the electromagnetic reflecting device are 28.0 GHz.

Based on Examples 5 and 6, it can be understood that a protection effect can be obtained while the reflection attenuation is suppressed to the minimum, by covering the surfaces of the conductive main bodies 500 other than the facing surfaces facing the edges 11*e* of the reflection panels 11 with the non-conductive protective coating 59. According to Example 7, it can be understood that the increase of the reflection attenuation is trivial even in the case where the surfaces facing the edges 11*e* of the reflection panels 11 are covered with the non-conductive protective coating 59, and therefore a protection effect and reflection characteristics can be maintained at the same time. In Examples 5, 6, and 7, the measurement is performed in a state where the reflection panels 11 are inserted until the reflection panels 11 come into contact with the main bodies 500 of the frames (with zero offset), and it is presumed that good reflection characteristics would be maintained in these examples even in the case where the reflection panels 11 are held in a state where the edges 11*e* of the reflection panels 11 are not exposed to the outside of the frames 50 as in Examples 2 through 4.

Figure 12:
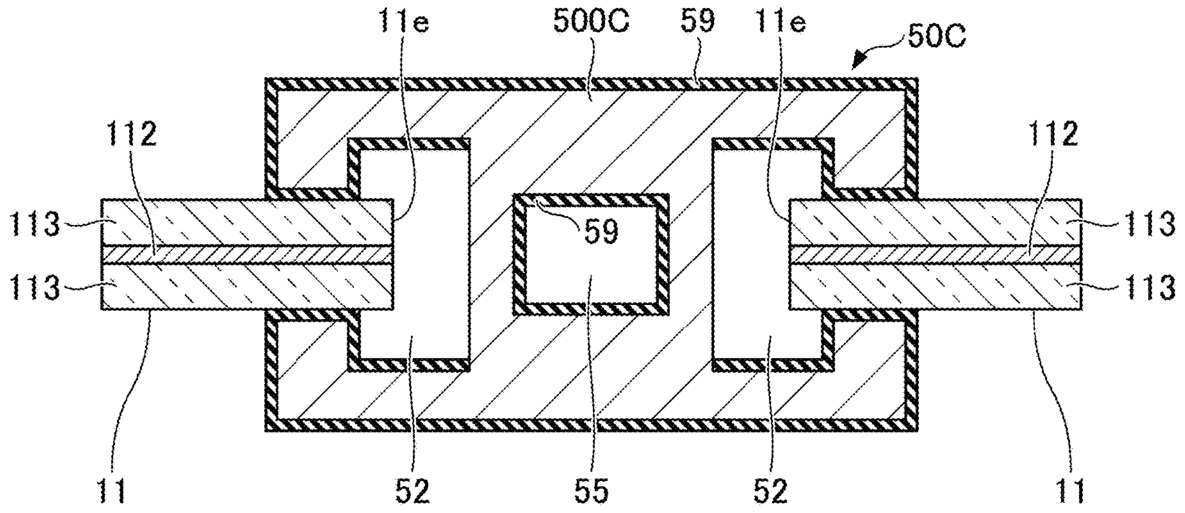
FIG. 12 is a diagram illustrating a state in which panels are inserted into the frame of FIG. 9.
Figure 13:
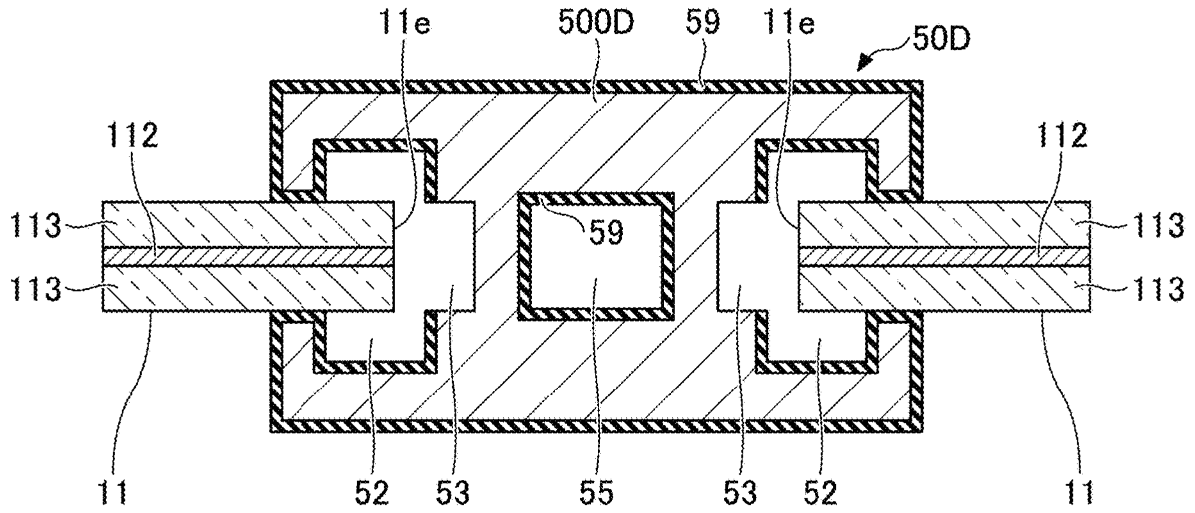
FIG. 13 is a diagram illustrating a state in which panels are inserted into the frame of FIG. 10.

For example, as illustrated in FIG. 12, the reflection characteristics equivalent to those of Example 5 are expected even in a state where the reflection panels 11 are inserted partway into the conductive main bodies 500C to which the protective coating 59 is applied except for the facing surfaces 521. For example, as illustrated in FIG. 13, the reflection characteristics equivalent to those of Example 6 are expected even in a state where the reflection panels 11 are inserted partway into the conductive main bodies 500D to which the protective coating 59 is applied except for the base surfaces 531 and the side surfaces 532 of the grooves 53. The base surfaces 531 of the grooves 53 may be exposed, and the side surfaces 532 may be covered with the protective coating 59. In both FIGS. 12 and 13, it is not necessary to cover all of the frame inner surfaces with the protective coating 59 except for the surfaces facing the edges 11*e* of the reflection panels 11. At least portions of the surfaces of the conductive portions of the frames, except for the surfaces facing the edges 11*e*, may be provided with a non-conductive protective coating 59. For example, the inner walls of the grooves 53 and the cavities 52 may not be covered with the protective coating 59 but the inner walls of the slits 51 and the outer surfaces of the frames may be covered with the protective coating 59. Also, the inner walls of the hollows 55 need not necessarily be covered with the protective coating 59. Even in the case where the reflection panels 11 are inserted partway into the main bodies 500E in the configuration of FIG. 11, the same reflection characteristics as those of Example 7 can be expected.

Although the present invention has been described based on the specific embodiments, the present invention is not limited to the above-described configuration examples. The conductive layer 112 of the reflection panel 11 may extend from the edge 11*e* to the surface of either one of the dielectric layers 113. In this case, particularly in the frame 50D of FIG. 10, an electrical connection between the adjacent reflection panels 11 is well maintained in the case where the reflection panels 11 are inserted to the end of the grooves 53 in which the base surfaces 531 and the side surfaces 532 are exposed. In the case where the slits are coated with a protective coating, even if there is no direct electrical connection, scattering caused by the edges is turned into diffused reflection in the slits, and an angle of reflection as the electromagnetic wave reflecting device would result in a desired direction. Instead of interposing the conductive layer 112 between two dielectric layers 113, the conductive layer 112 may be formed on the front surface of one dielectric plate, and a ground layer may be formed on the rear surface. The surface of the conductive layer 112 formed on the front surface of the dielectric plate may be covered with a protective sheet made of resin or the like.

Figure 14A:
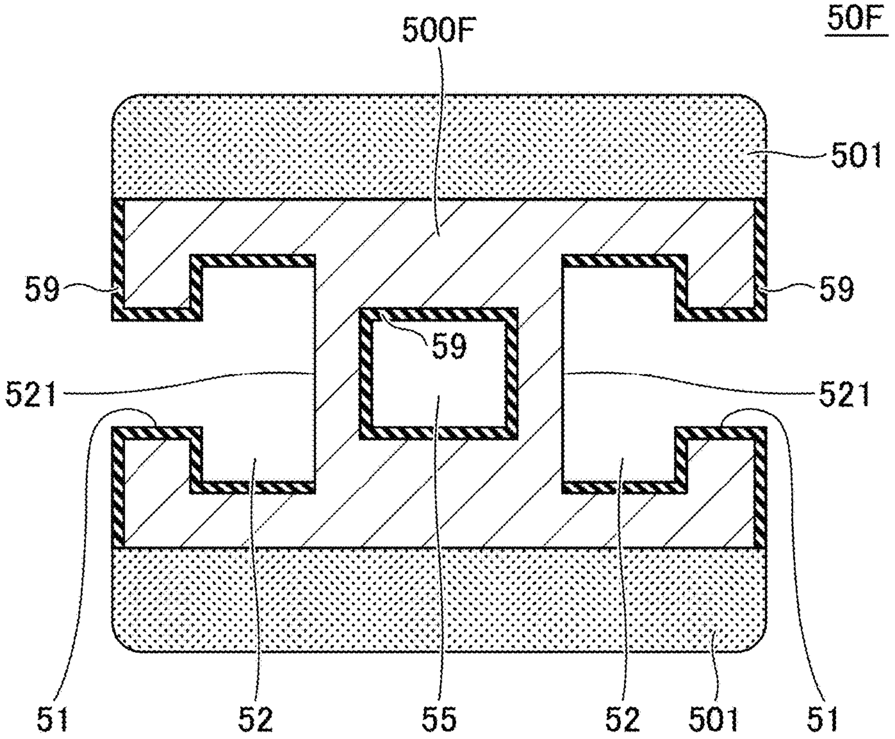
FIG. 14A is a diagram illustrating a modification of the frame.
Figure 14B:
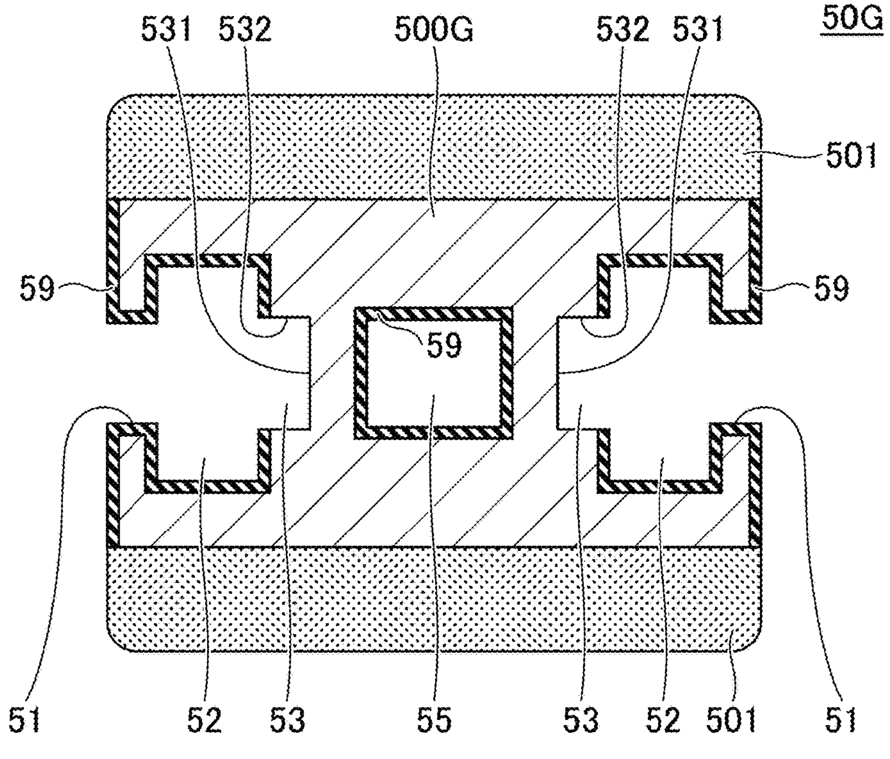
FIG. 14B is a diagram illustrating a modification of the frame.

The above-described embodiments may be combined with each other. From the viewpoint of the easiness of the manufacturing process, the protective coating 59 may be applied to the entire surface of the frames 50, and after the protective coating 59 on the surfaces facing the edges 11*e* of the reflection panels 11 are peeled off, the non-conductive cover 501 may be bonded to the protective coating 59 covering the outside of the frames 50. Alternatively, as illustrated in a modification of FIG. 14, a resin-made cover 501 may be provided on the outer surfaces of the conductive portions of the frames 50, and a protective coating 59 may be applied to the edge surfaces 503 (see FIG. 5) and the inner walls of the frames 50, so that the facing surfaces facing the edges 11*e* of the reflection panels 11 are exposed. In the frame 50F illustrated in FIG. 14A, a protective coating 59 is applied to a part of the inner walls of the conductive main body 500F having the same shape as that illustrated in FIG. 2A, which are not covered with the cover 501, so that the conductive facing surfaces 521 are exposed. In the frame 50G illustrated in FIG. 14B, a protective coating 59 is applied to a part of the inner walls of the conductive main body 500G having the same shape as that illustrated in FIG. 2B, which are not covered with the cover 501, so that the base surfaces 531 and the side surfaces 532 of the conductive grooves 53 are exposed. As illustrated in FIG. 11, the protective coating 59 on the facing surfaces 521 or 531 may be left without being removed. In addition to the frames 50, either or both of the top frames 57 and the bottom frames 58 may have a non-conductive protective coating 59 on the conductive portions of the frames. In this case, the protective coating 59 on the conductive facing surfaces facing the top edges or the bottom edges of the reflection panels 11 may be peeled off, or the protective coating may be maintained.

In the electromagnetic wave reflecting fence 100 formed by joining a plurality of electromagnetic wave reflecting devices 10, each of two adjacent reflection panels 11 is held by the frames 50 in a state that the edges 11*e* are in contact with or not in contact with the conductive facing surfaces 521 or 531 of the frames 50. In the case where the flatness of the installation surface of the electromagnetic wave reflecting fence 100 is insufficient, or depending on the installation environment, the reflection panels 11 may not be completely inserted into the frames 50; however, by adopting the frame configuration of the embodiment, even if the edges of the reflection panels 11 are slightly shifted, good reflection characteristics are maintained as long as the edges are not exposed to the outside of the frames 50.

The size (width×height) of the reflection panel 11 of the electromagnetic wave reflecting device 10 can be selected as appropriate within a range from 30 cm×30 cm to 3 m×3 m. As the size of the reflection panel 11 increases, higher stability for installation is demanded. By adopting the frame configuration of the embodiment, the reflection panels 11 can be stably held while the deterioration of reflection characteristics is suppressed. In the case where a plurality of reflection panels 11 are joined is used as the electromagnetic wave reflecting fence 100, even if the edges 11*e* of the reflection panels 11 are slightly shifted, a reflection potential can be well maintained between the adjacent reflection panels. The electromagnetic wave reflecting device and the electromagnetic wave reflecting fence of the embodiment are also effectively used in indoor and outdoor event facilities, facilities such as factories, process lines, offices having many electronic devices, and the like.

The invention claimed is:

1. An electromagnetic wave reflecting device, comprising:
- a reflection panel that reflects a radio wave of a desired band selected from a frequency band between 1 GHZ and 170 GHz; and
- a frame that holds the reflection panel, wherein
- the frame has a conductive portion,
- the reflection panel is held by the frame so that an edge of the reflection panel is not exposed to an outside of the frame, and
- at least a part of the conductive portion of the frame is covered with a non-conductive protecting member or protective coating.

2. The electromagnetic wave reflecting device according to claim 1, wherein
- a conductive facing surface that faces the edge in an inside of the frame is covered with the protecting member or the protective coating.

3. The electromagnetic wave reflecting device according to claim 1, wherein
- a conductive facing surface that faces the edge in an inside of the frame is not covered with the protecting member or the protective coating.

4. The electromagnetic wave reflecting device according to claim 1, wherein
- the frame includes a conductive main body, a slit into which the reflection panel is inserted, and a cavity communicating with the slit, and
- an outer surface of the main body and the slit are covered with the protective coating.

5. The electromagnetic wave reflecting device according to claim 4, wherein
- the reflection panel is held in the slit in a state in which the edge of the reflection panel is in contact or not in contact with a base surface of the cavity.

6. The electromagnetic wave reflecting device according to claim 5, wherein
- the main body has a hollow that is separated from the slit and the cavity.

7. The electromagnetic wave reflecting device according to claim 1, wherein
- the frame includes a conductive main body, a slit into which the reflection panel is inserted, a cavity communicating with the slit, and a groove formed in the cavity,
- a base surface of the groove is a facing surface facing the edge, and
- an outer surface of the main body and the slit are covered with the protective coating.

8. The electromagnetic wave reflecting device according to claim 7, wherein
- the reflection panel is held by the slit in a state in which the edge is in contact or not in contact with the base surface of the groove.

9. The electromagnetic wave reflecting device according to claim 8, wherein the main body has a hollow that is separated from the cavity and the groove.

10. The electromagnetic wave reflecting device according to claim 1, wherein the frame includes a conductive main body and a non-conductive cover provided on an outer surface of the main body.

11. The electromagnetic wave reflecting device according to claim 10, wherein a part of an outer surface and an inner wall of the main body are covered with the protective coating, and the non-conductive cover is bonded to the protective coating covering the outer surface of the main body.

12. An electromagnetic wave reflecting fence being formed by joining a plurality of the electromagnetic wave reflecting devices of claim 1 in a width direction of the frame, wherein each of two adjacent reflection panels is held by the frame in a state in which an edge of the reflection panel is in contact or not in contact with a facing surface facing the edge in an inside of the frame.

* * * * *